W. C. GRIMES.
SPARK ARRESTER.
No. 4,069. Patented June 7, 1845.
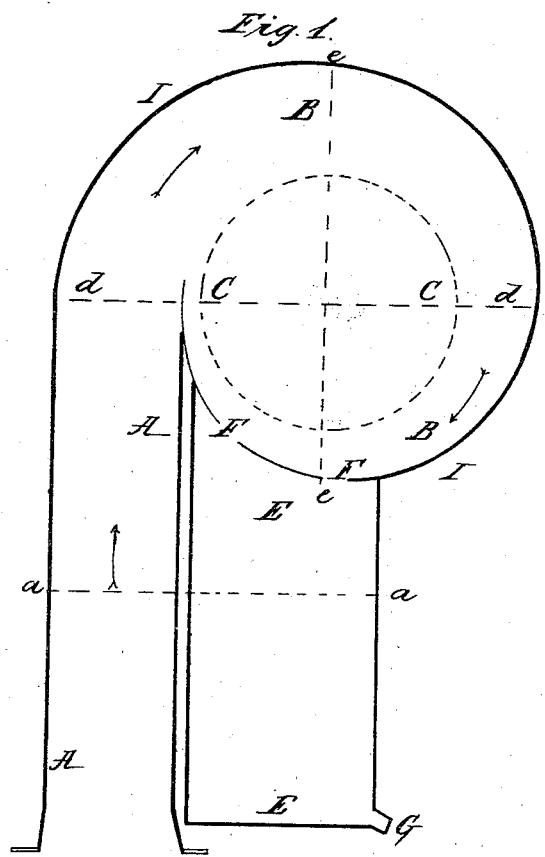
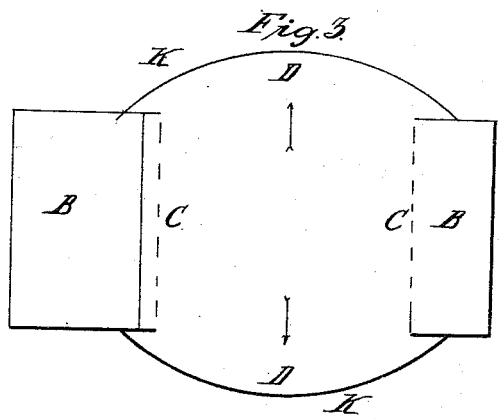
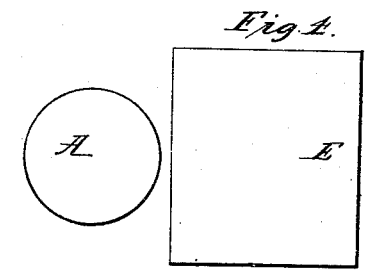
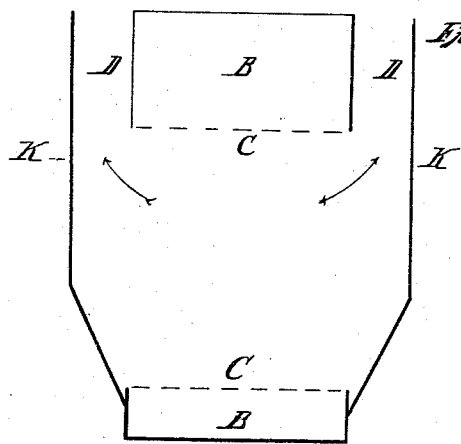
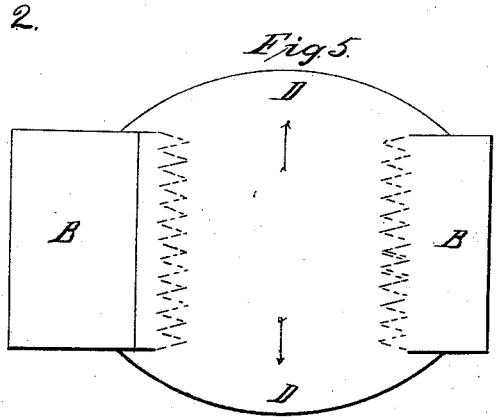

UNITED STATES PATENT OFFICE.

WILLIAM C. GRIMES, OF PHILADELPHIA, PENNSYLVANIA.

SPARK-ARRESTER.

Specification of Letters Patent No. 4,069, dated June 7, 1845; Antedated March 1, 1845.

*To all whom it may concern:*

Be it known that I, WM. C. GRIMES, of the city of Philadelphia and State of Pennsylvania, have invented a new and useful Improvement in the Construction of Spark-Arresters; and I hereby declare that the following is a full and exact description.

My invention consists in conveying the gaseous current that rushes from the flues or chimneys of locomotive steam engines, around a convex or cylindrical screen by giving to a part of the flue, chimney, or passage, a curved or convoluted form with the inner walls formed of perforated sheet metal or other material. In passing through the curved or convoluted part of the flue the sparks and other solid particles acquire a centrifugal force which drives them to the outer circle or walls of the flue or passage, through which holes or perforations are made of a size that allow them to escape into an exterior chamber or chambers made for the purpose. While by centrifugal force the sparks and solid particles are driven into exterior chambers the gaseous current is absorbed or forced into the central chamber formed by the cylindrical screen from whence it passes into the atmosphere through the open ends of the same. In the accompanying sketch Figure 1 is a vertical section of the apparatus. A is the chimney; B, the convoluted flue or passage; C, the cylindrical screen, the length or depth of which is about equal to its diameter; D, holes or openings in the outer walls through which the sparks escape into the receptacle or chamber E. I have thus described my invention in its simplest form, but to get an increased extent of perforated surface within a narrower compass, I sometimes make use of several cylindrical screens, which I arrange around the upper part of the chimney with their axes parallel to the same. The chimney is there divided into several lateral flues which pass out in a horizontal direction and around the cylindrical screens, which last are open at the upper ends only.

In each of the preceding forms that portion of the gaseous current that has completed a revolution around the circular screen, recommences its circuit beneath the main current, as the latter enters the circular passage, thus bringing the sparks that may yet remain in the gases so near the perforated surface as to leave them liable to be drawn upon the screen by the centripetal force of the current. To obviate this tendency I sometimes give to the convoluted flue a wider sweep and return it into itself upon the outside of where it first enters the circular passage as shown at Fig. 2 in the sketch annexed. G is the chimney; H, the convoluted flue; I, the convoluted screen; J, hole or opening in the outer wall, through which the sparks pass into the tube K that leads to a larger receptacle below.

What I claim as new and as constituting my invention and desire to secure by Letters is—

The mode of separating the sparks and other solid particles from the gaseous current that rushes from locomotive or other steam engine chimneys, by giving to the chimney flue, or passage, a curved or convoluted form, around a perforated surface or cylindrical screen, or, in other words, by forming the inner walls of a spiral, curved, or convoluted flue or smoke passage, of perforated iron or other material as hereinbefore set forth.

WM. C. GRIMES.

Witnesses:
DAVID R. BROWN,
JOSEPH BROWN.